United States Patent
Lu et al.

(10) Patent No.: US 8,663,826 B2
(45) Date of Patent: Mar. 4, 2014

(54) BATTERY ASSEMBLY AND FITTING SET THEREOF

(75) Inventors: Ruifa Lu, Shenzhen (CN); Yi Lu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1376 days.

(21) Appl. No.: 11/966,698

(22) Filed: Dec. 28, 2007

(65) Prior Publication Data

US 2008/0182164 A1 Jul. 31, 2008

(30) Foreign Application Priority Data

Jan. 26, 2007 (CN) .................. 2007 2 0118321 U

(51) Int. Cl.
*H01M 2/10* (2006.01)

(52) U.S. Cl.
USPC ........................................... 429/97; 429/100

(58) Field of Classification Search
CPC combination set(s) only.
See application file for complete search history.

(56) References Cited

U.S. PATENT DOCUMENTS

| | | | |
|---|---|---|---|
| 6,730,432 B1 * | 5/2004 | Grosfeld et al. | 429/97 |
| 2002/0027769 A1 * | 3/2002 | Kasahara et al. | 361/683 |
| 2006/0281002 A1 | 12/2006 | Aoki et al. | |

FOREIGN PATENT DOCUMENTS

| | | | |
|---|---|---|---|
| JP | 11274758 | | 10/1999 |
| JP | 11345038 | | 12/1999 |
| JP | 11345038 A | * | 12/1999 |
| JP | 2002141035 | | 5/2002 |
| JP | 2005197179 | | 7/2005 |
| JP | 2005197179 A | * | 7/2005 |

* cited by examiner

*Primary Examiner* — Ula C Ruddock
*Assistant Examiner* — Daniel Gatewood
(74) *Attorney, Agent, or Firm* — Kory D. Christensen; Stoel Rives LLP

(57) ABSTRACT

A fitting set, including a battery assembly and a receiver having a recess for receiving the battery assembly are disclosed. The battery assembly may include a casing having a top wall, a bottom wall, two first sidewalls, and two second sidewalls. The battery assembly may further include a resilient member and a self-locking block. The first sidewalls may include notches extending to the bottom wall. The recess may include lugs on one or more of the inners walls, each of which may be engaged with a corresponding notch. The second sidewalls may each include a first stopper and one or more second stoppers, the first and second stoppers having a difference in height. The resilient member at both ends may abut against the first stopper and self-locking block, respectively, and may also press the self-locking block against an edge of the recess.

10 Claims, 5 Drawing Sheets

BATTERY ASSEMBLY AND FITTING SET THEREOF

RELATED APPLICATIONS

The present application claims priority to Chinese Patent Application No. 200720118321.7, filed on Jan. 26, 2007, and entitled "Battery Assembly and Fitting Set Thereof," the disclosure of which is fully incorporated herein by reference.

TECHNICAL FIELD

The present disclosure relates to a battery assembly and a set for fixing the battery assembly.

DETAILED DESCRIPTION

Figure 1:
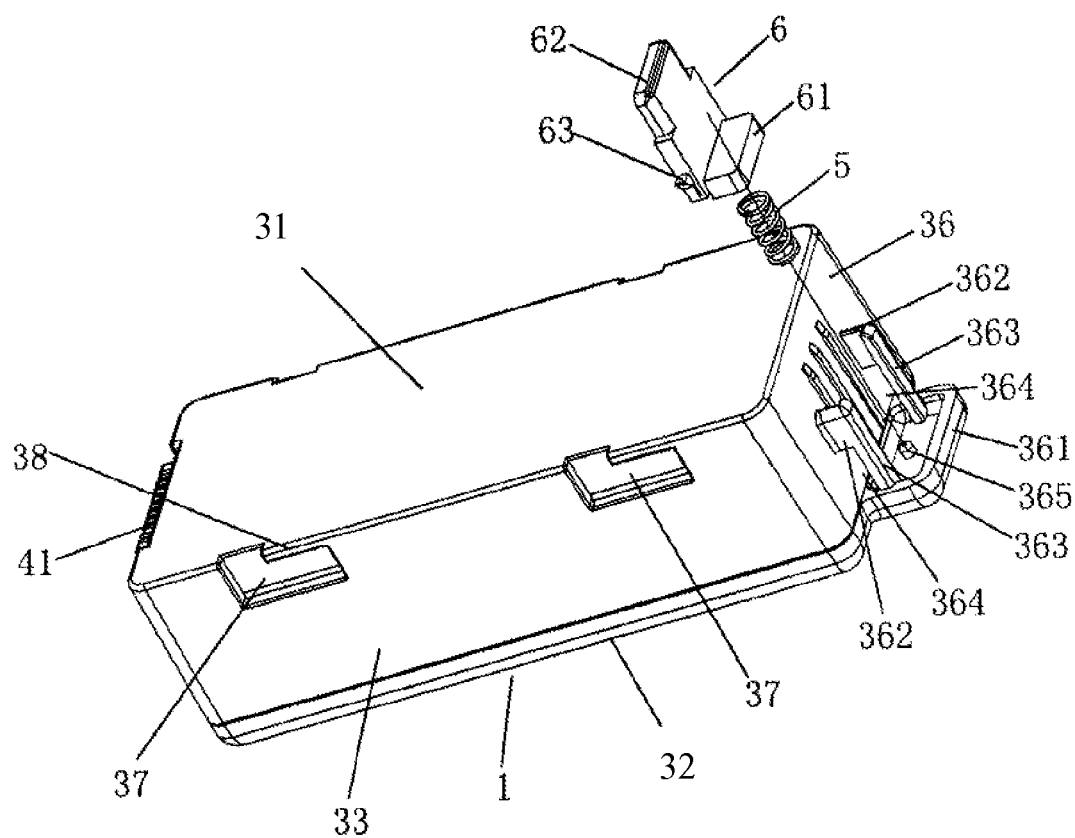
FIG. 1 is a three-dimensional schematic view of a battery assembly of an embodiment of the disclosure (without a self-locking block and a resilient member loaded into the casing).

Current battery fitting sets are generally configured such that the battery is disposed into a receiver made from a metal sheet. Battery contacts and their associated parts are secured to one end of the receiver (i.e., the battery is loaded into the receiver with the battery contact adjacent to a connector of the receiver); and a battery clip or a battery blocking bar is secured to the other end of the receiver to hold the battery. Usually, a cover is further configured to cover the battery.

To ensure proper battery orientation in the axial and radial directions and thereby connection reliability, various mechanisms are generally included. First, to ensure the axial orientation of the battery and connection reliability, a battery clip (or a battery blocking bar) is additionally introduced at one end of the receiver (i.e., the end remote from the battery connector) to prevent the battery from falling out.

Moreover, to prevent the battery connection part from being damaged by an impact test, a supporting screw is installed on the connector to the printed circuit board (PCB), and an adjusting gasket is also installed to make sure that the end face of the supporting screw is slightly higher than the bottom face of the battery connector, so that in an impact test, the impact force acts on the supporting screw, thus transferring the applied force to the connector mounting plate.

Finally, to prevent impact on the battery connector when the battery is loaded backwards, a stop is arranged on the metal sheet having the battery connector installed thereon (e.g., a long bolt may be installed on the metal sheet to correspond to the respective position of a semicircular slot of the battery).

Conventional battery fitting sets are typically burdened with a number of auxiliary structures, thereby complicating design and orientation. In addition, when exchanging batteries, one must open the battery cover first, and then press the battery clip (or the battery blocking bar) before taking out the battery. Therefore, several steps are needed to exchange batteries.

According to an embodiment of the present disclosure, a battery assembly and a fitting set thereof is provided that overcomes the disadvantages of conventional approaches. The disclosed battery assembly and fitting set are reliably installable, easily operable, and efficient in preventing operator error.

In one embodiment, a battery assembly includes a casing and a battery accommodated therein, the casing having a top wall, a bottom wall, two first sidewalls extending in the lengthwise direction of the battery and two second sidewalls extending in the widthwise direction of the battery, with one of the second sidewalls having a cutout through which a battery contact passes. The battery assembly further includes a resilient member and a self-locking block. The first sidewalls include notches extending to the bottom wall. One of the second sidewalls includes a first stopper and two second stoppers. The first stopper extends from the casing further than the two second stoppers and the self-locking block has barbs on opposing sides thereof. The resilient member abuts against the first stopper and the self-locking block at opposite ends of the resilient member and presses the barb against the second stoppers.

The first stopper is connected to the second stoppers through a limiter block in one embodiment. The limiter block, the first stopper, the second stoppers, and one of the second sidewall may define a stop groove into which the barb is inserted and moved up and down. In one configuration, the self-locking block has a horizontal base plate and a vertical plate that has the barbs arranged on opposite surfaces thereof. The number of second stoppers, limiter blocks, and channels may be at least two, with the vertical plate being inserted between the at least two second stoppers, the base plate being inserted between the at least two limiter blocks, and the resilient member pressing against the base plate. The first stopper may include a mounting post, onto which the resilient member is telescoped. The cutouts may be sealed from the battery contact with a preferably resilient waterproof gasket.

In one embodiment, the fitting set includes a battery assembly and a receiver, the receiver having a recess into which the battery assembly is loaded, and the battery assembly including a casing, said casing having a top wall, a bottom wall, two first sidewalls extending in the lengthwise direction of the battery and two second sidewalls extending in the widthwise direction of the battery, with one of the second sidewalls having a cutout through which the battery contact passes.

The battery assembly may further include a resilient member and a self-locking block. The first sidewalls may include notches extending to the bottom wall. The recess is provided with lugs, each of which may slide into respective corresponding notches. The other second sidewall may include a first stopper and second stoppers that have a difference in height such that they are positioned at different locations between the top and bottom walls. The resilient member abuts against the first stopper and the self-locking block at opposite ends and presses the self-locking block against an edge of the recess. The recess wall of the recess may include a protruding loop that is received in the cutout and closely contacts with the gasket.

Advantageously, the battery assembly can be automatically locked upon installation by means of the resilient member and the self-locking block on the casing. By positioning the lugs of the receiver to correspond to the notches, which can prevent reverse installation, the receiver can be fixed very securely, thus preventing erroneous operations. Furthermore, it is possible to exchange batteries in the battery assembly using one hand only, thereby making the assembly easy to use.

Figure 2:
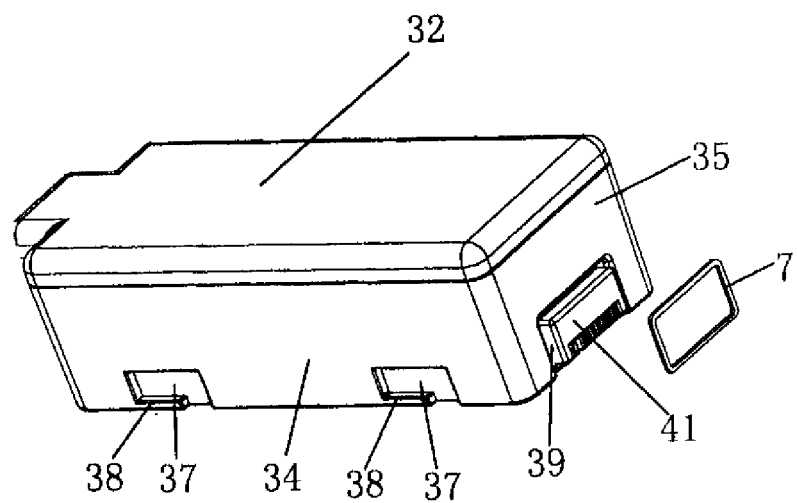
FIG. 2 is a three-dimensional schematic view of the battery assembly (without a gasket loaded into the casing).
Figure 3:
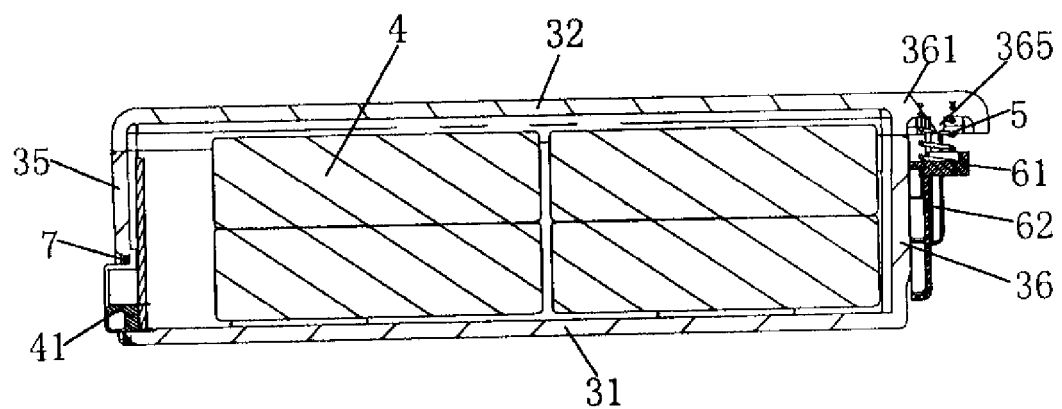
FIG. 3 is a sectional view of the battery assembly.
Figure 4:
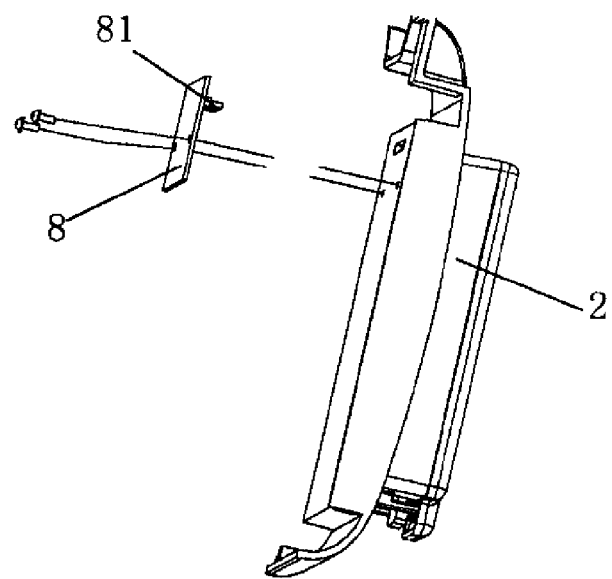
FIG. 4 is an exploded perspective view of an interface plate and the receiver prior to installation.
Figure 5:
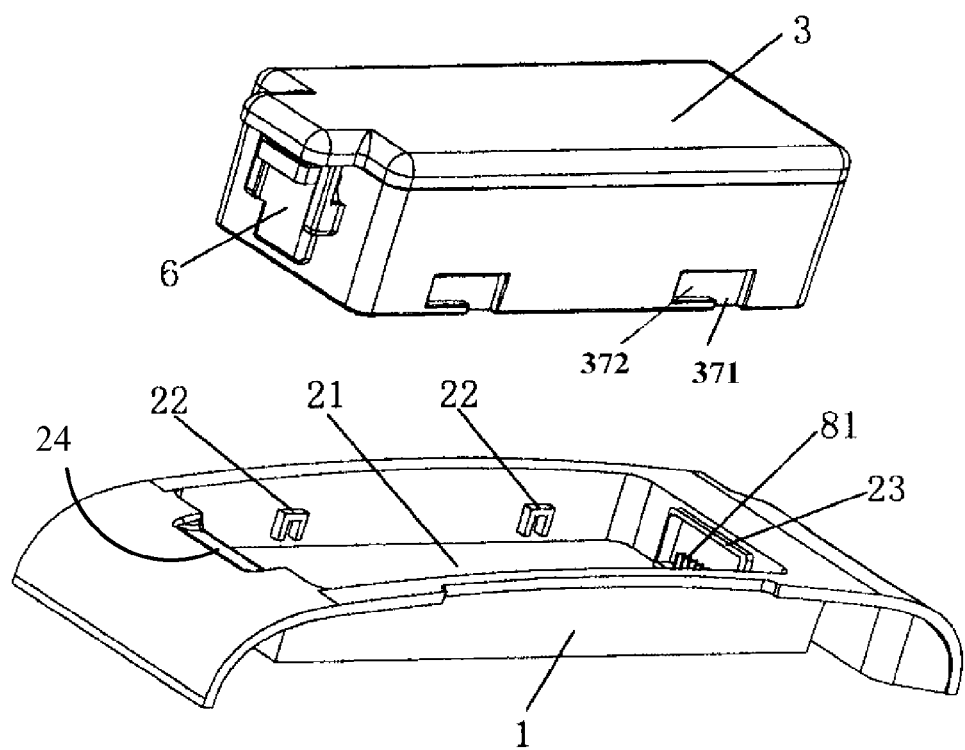
FIG. 5 is an exploded perspective view of a fitting set of an embodiment of the disclosure.
Figure 6:
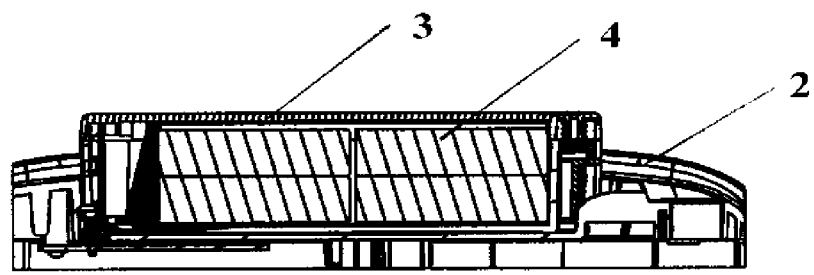
FIG. 6 is a sectional view of the battery assembly being loaded into the receiver.
Figure 7:
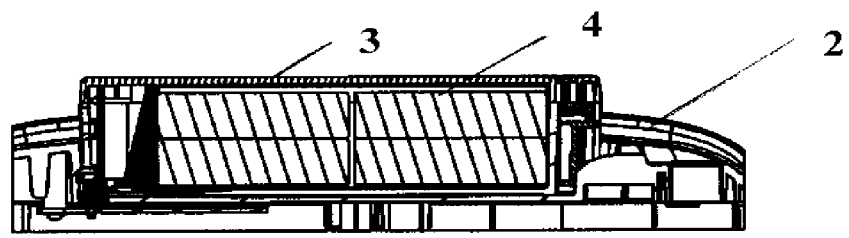
FIG. 7 is a sectional view of the battery assembly being taken out of the receiver.
Figure 8:
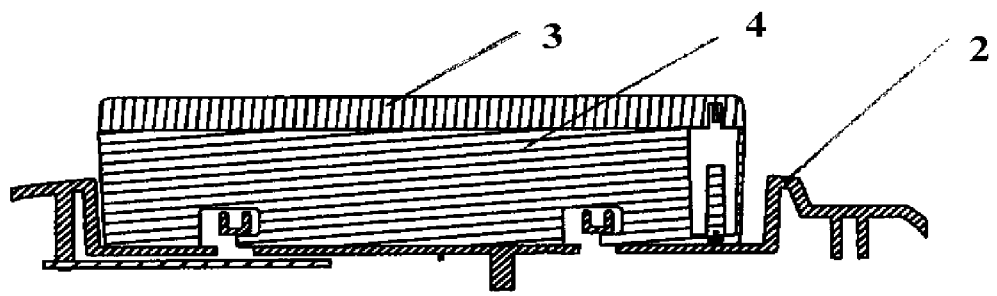
FIG. 8 is a sectional view of the battery assembly completely loaded into the receiver.
Figure 9:
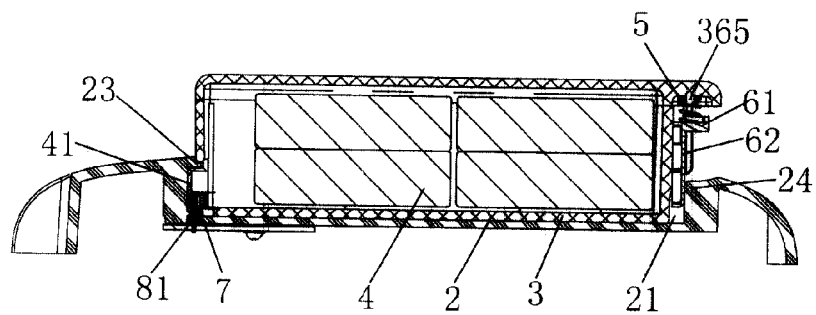
FIG. 9 is a sectional view of the battery assembly and receiver.
Figure 10:
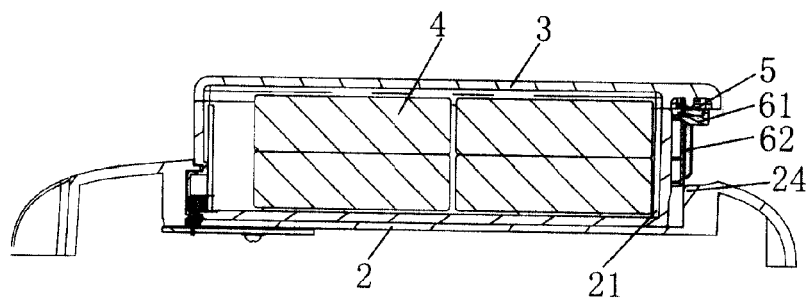
FIG. 10 is a sectional view of the battery assembly and receiver.
Figure 11:
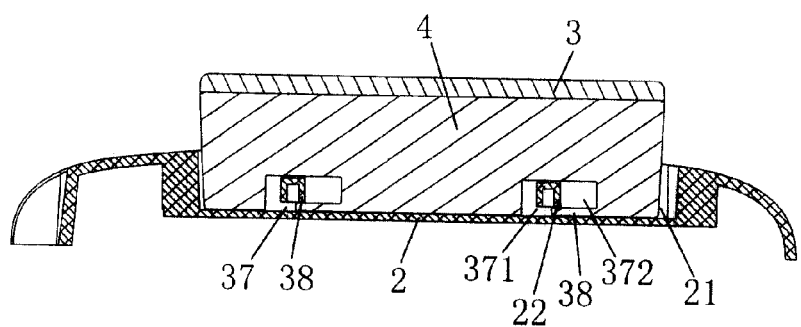
FIG. 11 is a sectional view of the battery assembly and receiver.

Referring now to FIGS. 1 through 11, one embodiment of a fitting set includes a battery assembly 1 and a receiver 2. The battery assembly 1 includes a casing 3, and a battery 4 is accommodated in the casing 3. The casing 3 includes a bottom wall 31, a top wall 32, two first sidewalls 33,34 extending in the lengthwise direction of the battery and two second sidewalls 35,36 extending in the widthwise direction of the battery. Each of the two first sidewalls 33, 34 includes at least two notches 37, each of which extends to the bottom wall 31. The notch wall of each notch 37 extends in the battery lengthwise direction from an engaging plate 38, through which each notch 37 is divided into a first notch 371 extending in the battery thickness direction (i.e., between the top and bottom walls) and a second notch 372 extending in the battery lengthwise direction, the first notch 371 overlapping with the second notch 372.

One of the second sidewalls 35 may include a cutout 39, from which a battery contact 41 protrudes. A gasket 7, which is preferably resilient and waterproof, seals the gap between the cutout 39 and the battery contact 41. The other second sidewall 36 may include a first stopper 361 extending horizontally and at least two second stoppers 362. The first stopper 361 and the at least two second stoppers 362 have a difference in height (i.e., they are positioned at different locations along the thickness direction of the battery), and are connected with one another by vertical limiter blocks 363. A channel 364 is defined between the first stopper 361 and the second stoppers 362, and between the limiter blocks 363 and the second sidewall 36, respectively. The first stopper 361 has a mounting post 365 extending upwardly and vertically.

In one embodiment, the battery assembly 1 further includes a resilient member 5 and a movable self-locking block 6. The resilient member 5 may be, for example, a spring 5. The self-locking block 6 includes a horizontal base plate 61 and a vertical plate 62 with opposing side edges of the vertical plate 62 protruding with a barb 63. In these embodiments, the distance between the at least two limiter blocks 363 is slightly larger than the width of the base plate 61 of the self-locking block 6, to provide convenience for loading the self-locking block 6.

When installing the battery assembly, the bottom of the spring 5 is telescoped onto the mounting post 365, and then the self-locking block 6 is loaded from the top down. The installed battery assembly is configured such that the vertical plate 62 is inserted between the at least two second stoppers 362, the base plate 61 of the self-locking block 6 is inserted between the two limiter blocks 363, and the two barbs 63 are inserted into the two channels 364, respectively. Because the base plate 61 of the self-locking block 6 presses the spring 5, the two barbs 63 are pressed against the second stoppers 362 under the force applied by the spring 5, whereby the self-locking block 6 is supported resiliently on the first stopper 361 through the spring 5.

A recess 21, centered in the receiver 2, includes lugs 22 and a protruding loop 23 on the recess wall, each of the lugs 22 corresponding to the notches 37, and the protruding loop 23 corresponding to the battery contact 41. The receiver 2 further comprises an interface plate 8 electrically connected with the battery contact 41 for securing the receiver 2 with a screw or the like, and aligned through an aligning hole in the receiver. An adapter 81 of the interface plate 8 extends into the protruding loop 23.

During installation, the battery assembly 1 is placed into the receiver 2 in alignment with the recess 21. The protruding loop 23 partially contacts with the protruding cutout 39 of the battery contact 41 so that the battery assembly is fixed into the receiver 2 against the side at which the self-locking block 6 is installed. At the same time, an edge 24 of the receiver may lift up the self-locking block base plate 61, causing the barbs 63 of the self-locking block to move upwardly in the channel 364 to facilitate the loading of the battery assembly, and causing the lug 22 of the receiver to slide into the first notch 371. After the battery assembly 1 is loaded abutting against the bottom of the recess 21, it is pushed in place toward one end of the adapter 81 (the protruding loop 23 of the receiver is loaded into the respective cutout 39 of the battery assembly to closely contact with the gasket 7, and the battery contact 41 is inserted into the adapter 81). The four lugs 22 of the receiver are inserted into four respective second notches 372 and engaged with the respective engaging plates 38.

Meanwhile, the self-locking block 6 may automatically move downward under the force of the spring 5, and press against the edge 24 of the receiver, so that the battery assembly 1 is reliably secured to the receiver 2. When exchanging batteries, the side of the battery assembly with the self-locking block 6 is gripped using one hand, while fingers pull the barb 63 of the battery self-locking block 6 out of the edge 24 of the receiver. Thereafter, pulling the battery assembly rearward disengages the four lugs 22 of the receiver from the four notches 37 while the battery contact is disengaged. Thereby, the battery can be easily released for exchange.

In this embodiment, the battery assembly can be automatically locked upon installation by means of the resilient member and the self-locking block on the casing. Further, by positioning the lugs of the receiver to correspond to the notches, which can prevent reverse installation, the receiver can be fixed very securely, thus preventing erroneous operations. Furthermore, it is possible to exchange batteries using one hand only, thereby making the assembly easy to use. In addition, one embodiment of the disclosure loads into respective cutouts of the casing a gasket that provides a resilient contact between the battery assembly and the receiver in the lengthwise direction, thereby preventing loosening of the battery assembly due to cumulative size errors, and preventing water or the like from penetrating from outside into the battery assembly through the battery contact part.

Those skilled in the art will appreciate that words as used herein, such as "a," "an," "one," and "two," are illustrative only and should by no means be construed as limiting in scope, and thus may be interpreted to include greater or a smaller numbers.

The present disclosure has been described hereinabove in detail in connection with the preferred embodiments, but it is not contemplated that the present disclosure is limited to the above particular embodiments. Those of ordinary skill in the art can understand that numerous modifications, changes or substitutions can be made to these embodiments without departing from the scope of the disclosure. For example, the gasket 7 may be configured as a one-piece member or as a two-piece member comprising an upper gasket and a lower gasket, among which the upper gasket is used to seal the sidewall 35 and the lower gasket is used to seal the bottom wall 31. All such modifications or substitutions shall be considered to fall within the scope of the disclosure. The scope of the present disclosure should, therefore, be determined only by the following claims.

What is claimed is:

1. A fitting set, including a battery assembly and a receiver, the receiver having a recess, into which the battery assembly is loaded, the battery assembly includes a casing, said casing having a top wall, a bottom wall, two first sidewalls extending in the lengthwise direction of the battery, and two second sidewalls extending in the widthwise direction of the battery, one of the second sidewalls provided with a cutout through which the battery contact passes, wherein the battery assembly further includes a resilient member coupled directly to the battery assembly and a self-locking block; wherein the first sidewalls are provided with notches extending to the bottom wall; wherein the recess is provided with lugs, each of which may slide into respective corresponding notches; wherein the other second sidewall is provided with a first and a second stoppers which have a difference in height, i.e., the thickness direction of the battery; and wherein the resilient member at both ends abuts against the first stopper and the self-locking block respectively and presses the self-locking block against the edge of the recess, and wherein the resilient member and battery assembly are configured for one handed actuation and removal.

2. The fitting set according to claim 1, wherein the first stopper and the second stopper are connected through a limiter block, the limiter block, the first stopper, the second stopper and the other of the second sidewalls defining channels therebetween, the self-locking block provided with a barb which is inserted into the channels and moved therein up and down.

3. The fitting set according to claim 2, wherein the self-locking block includes a horizontal base plate and a vertical plate, the barb arranged into the vertical plate; and wherein the number of the second stoppers, the limiter blocks and the channels is at least two, the vertical plate inserted between the at least two second stoppers, the base plate inserted between the at least two limiter blocks, and the resilient member pressing the base plate against the edge of the receiver recess.

4. The fitting set according to claim 1, wherein the cutout is sealed from the battery contact with a gasket.

5. The fitting set according to claim 4, wherein the recess is provided with a protruding loop on the wall, the protruding loop received in the cutout and closely contacting with the gasket.

6. The fitting set according to claim 2, wherein the cutout is sealed from the battery contact with a gasket.

7. The fitting set according to claim 6, wherein the recess is provided with a protruding loop on the wall, the protruding loop received in the cutout and closely contacting with the gasket.

8. The fitting set according to claim 3, wherein the cutout is sealed from the battery contact with a gasket.

9. The fitting set according to claim 8, wherein the recess is provided with a protruding loop on the wall, the protruding loop received in the cutout and closely contacting with the gasket.

10. The fitting set according to claim 1, wherein the resilient member is disposed such that it is compressible in a direction orthogonal to both the lengthwise direction of the battery and the widthwise direction of the battery.

\* \* \* \* \*